United States Patent Office 2,810,288
Patented Oct. 22, 1957

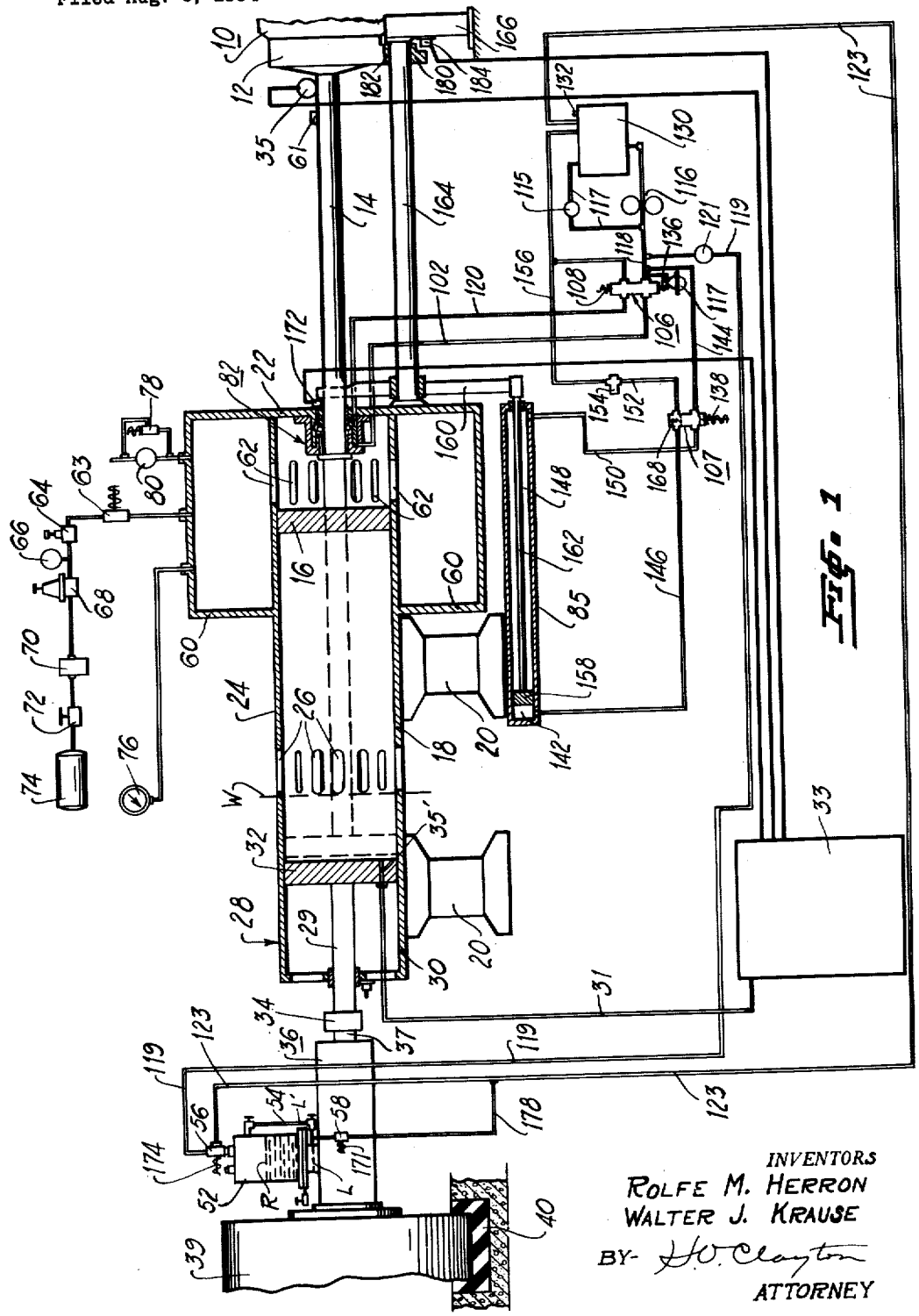

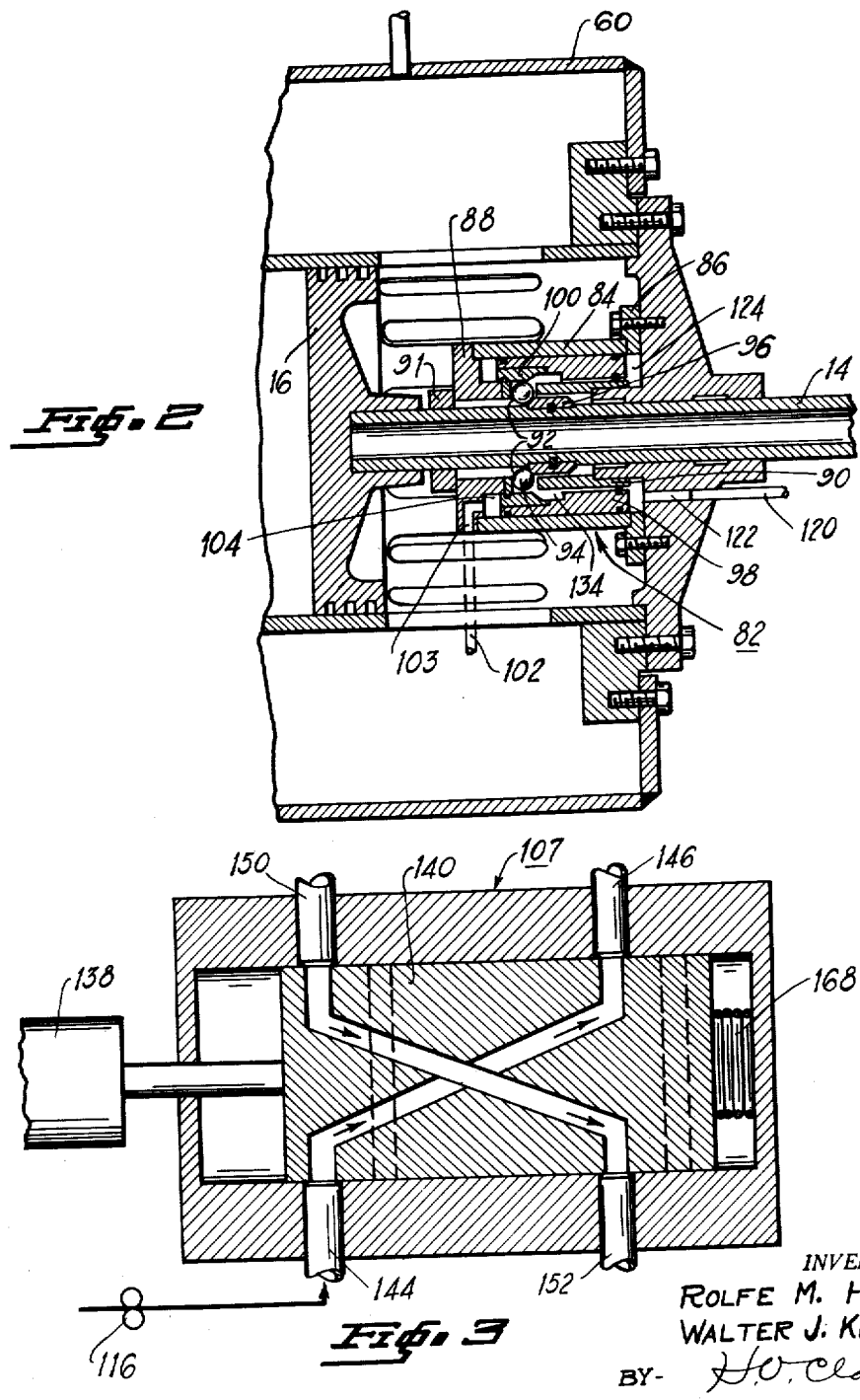

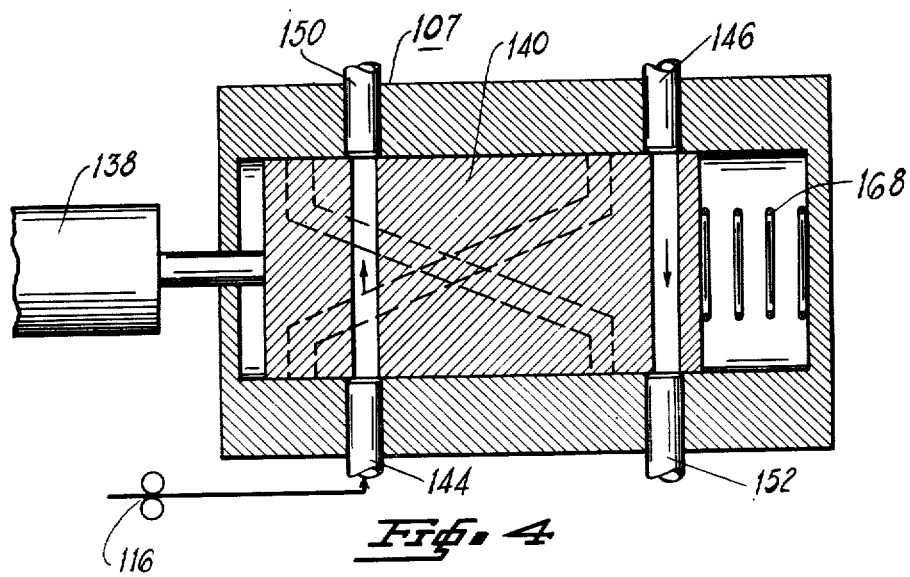
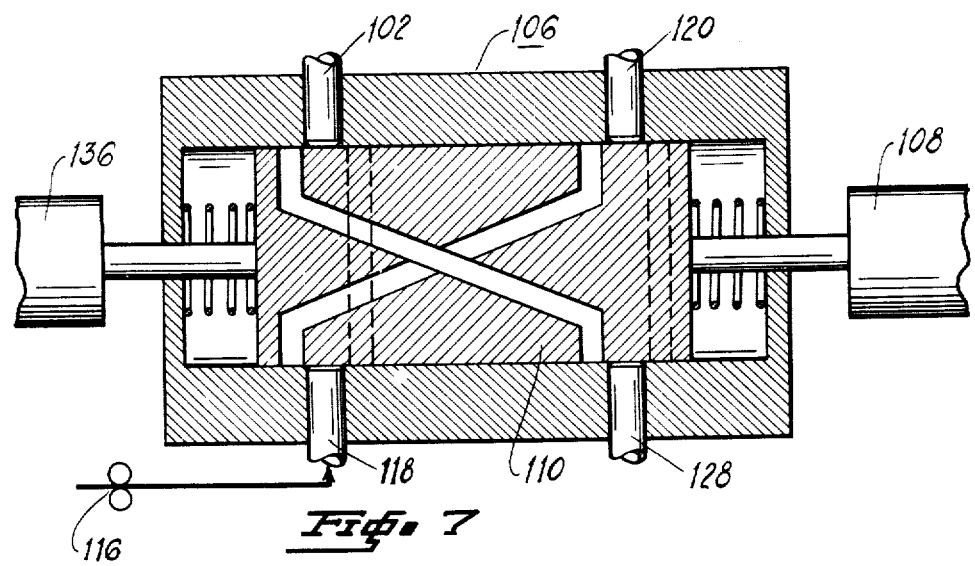

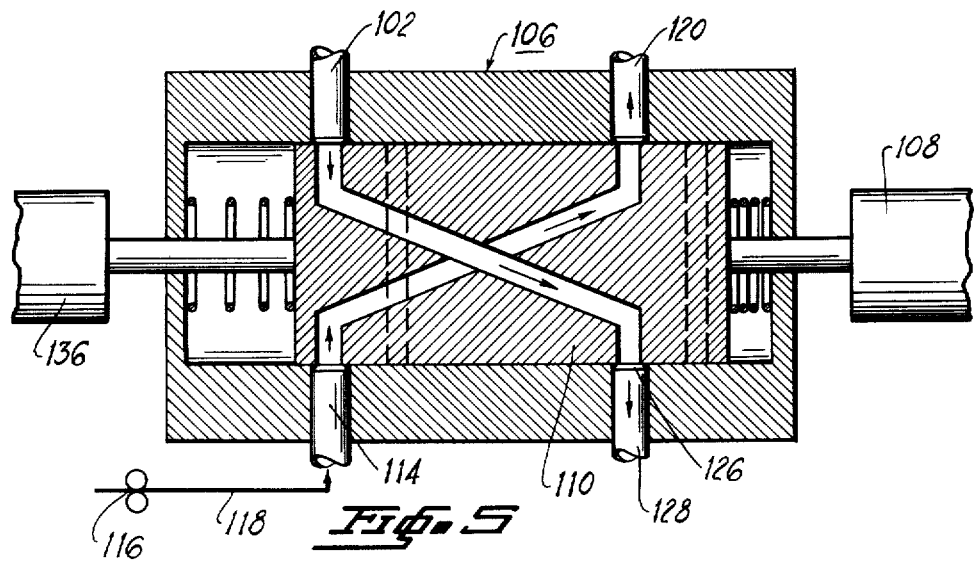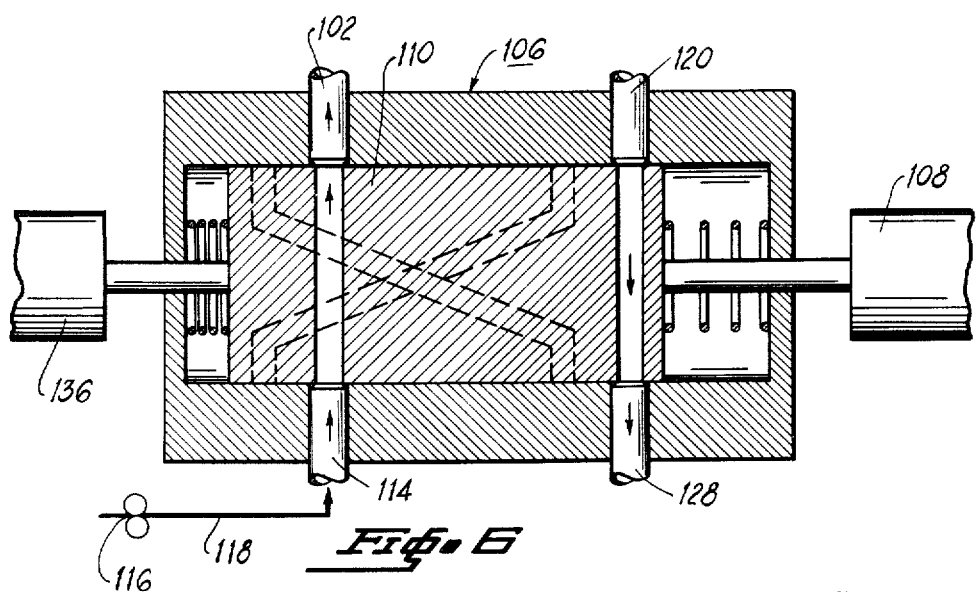

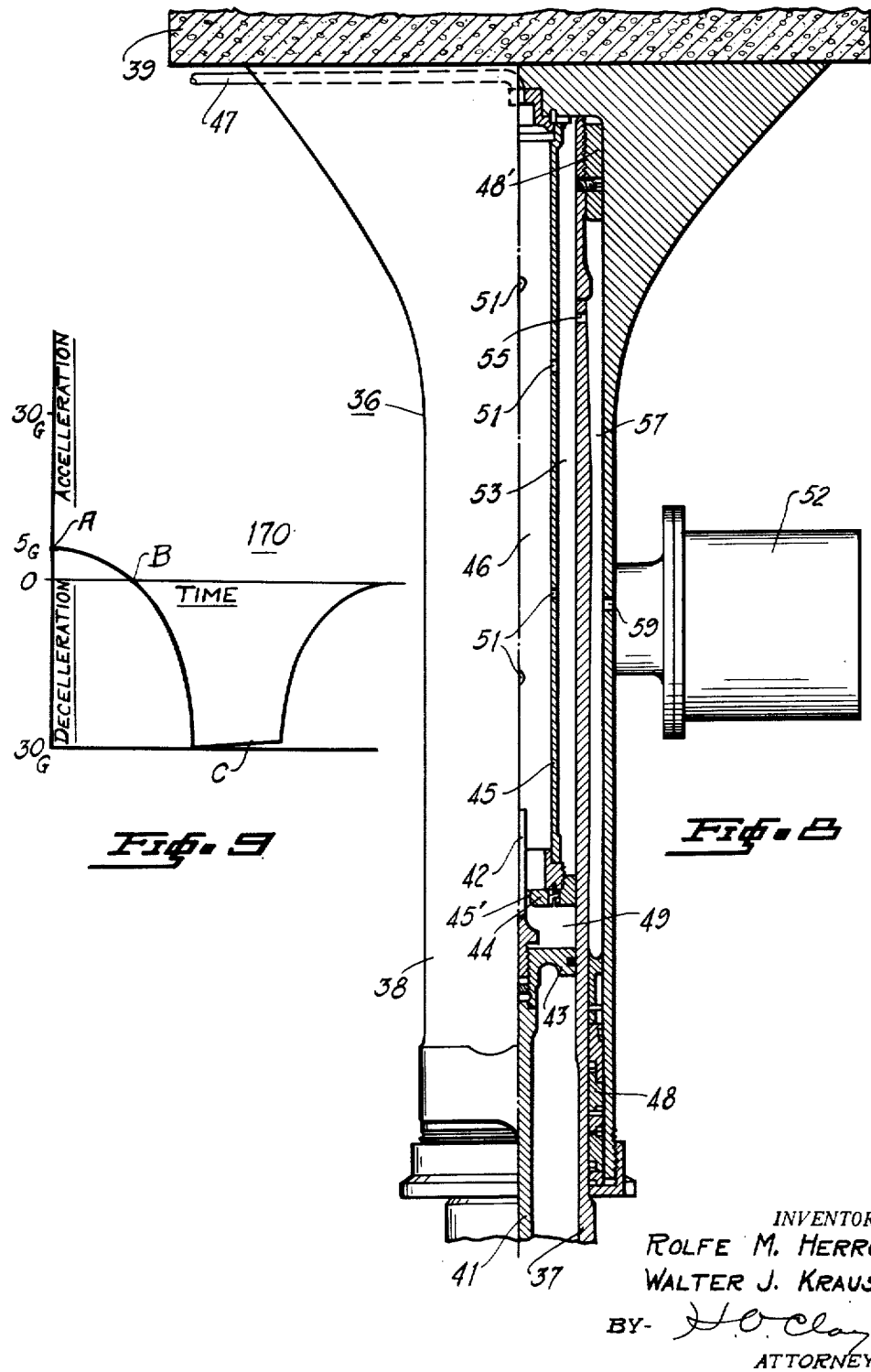

2,810,288

IMPACT TESTER

Rolfe M. Herron, Mishawaka, and Walter J. Krause, South Bend, Ind., assignors to Bendix Aviation Corporation, South Bend, Ind., a corporation of Delaware Application August 5, 1954, Serial No. 448,098

17 Claims. (Cl. 73—12)

This invention relates in general to testing mechanism and in particular to a mechanism for determining the effects upon a device, such as the pilot seat of an airplane or a guided missile, when the device is accelerated from a condition of rest to a condition of motion and when the device is decelerated when in motion.

Now the elements of a guided missile of the complicated type now proposed for modern warfare, are subjected to tremendous stresses and strains during the launching of the missile and during its flight; and it is an object of our invention to provide a testing mechanism for advising, for purposes including the record, as to the physical factors, including the factors of acceleration, deceleration, strain and velocity, necessary to determine the effectiveness and efficiency of the article or mechanism being tested, particularly its effectiveness during the period of time required to get the article or mechanism as a unit into a state of motion at a relatively high velocity.

Another object of our invention is to provide a test mechanism operative to simulate the effects of the launching of a so-called guided missile said mechanism also determining and recording, together with other data, the acceleration of the missile when launched by a rocket or its equivalent.

A further object of our invention is to provide a testing mechanism for simulating the launching operation of a guided missile, for in part simulating the operation of the guided missile in flight, and for determining certain of the effects of said operations including the acceleration and deceleration of the missile.

Yet another object of our invention is to provide a relatively simple, compact and easily serviced test mechanism, preferably including a pressure differential operated firing motor as its principal element, for changing the state of a guided missile from a state of rest to a state of motion in the operation of simulating a normal launching operation of the missile and by so doing determine the inertia effects to which the components of the missile are subjected.

Yet another object of our invention is to provide a mechanism for simulating and measuring the effects of a power means, such as a rocket, for launching a so-called guided missile proposed for use in modern warfare; and it is a further object of our invention to provide, by such a mechanism, means for simulating the deceleration of the missile and measuring the effects of said deceleration.

Other objects and advantages will become apparent from the accompanying drawings wherein:

Figure 1 is a diagrammatic view disclosing the several parts of the testing mechanism of our invention, the parts being shown in their ready to fire position;

Figure 2 is a sectional view disclosing details of the piston latching mechanism of the mechanism of Figure 1;

Figure 3 is a sectional view disclosing details of the return cylinder four way control valve in one of its operative positions;

Figure 4 is a view, similar to Figure 3, disclosing the valve of Figure 3 in the other of its operative positions;

Figure 5 is a sectional view disclosing details of the latch mechanism four way control valve in one of its operative positions;

Figure 6 is a view, similar to Figure 5, disclosing the valve of Figure 5 in the other of its operative positions;

Figure 7 is a view, similar to Figures 5 and 6, disclosing the valve of Figure 5 in its neutral position;

Figure 8 is a sectional view disclosing in some detail the mechanism of the shock strut constituting a part of the combination of our invention; and Figure 9 is a graph, plotting acceleration and deceleration against time, disclosing the mode of movement of the guided missile as the same is moved during its test by the mechanism of our invention.

There is disclosed in Figure 1, a diagrammatic view of the principal parts of the testing mechanism of our invention. A guided missile 10 or other device to be tested is adapted to be secured to an adapter plate 12 the latter being secured to one end of a piston rod 14 to which is secured a piston 16. The missile may, in the test laboratory, be supported by means including a shoe secured to the missile said shoe being slidably mounted in a track secured to an I beam. This supporting means is not disclosed in the drawings inasmuch as it constitutes no part of the invention disclosed in this application. The piston 16, which in the mechanism of our invention is known as a primary piston, is reciprocably mounted in a cylinder 18 which is suitably mounted on fixed standards 20. The cylinder is provided with an end portion 22 and the cylinder and piston 16 together constitute a pressure differential operated firing motor, preferably a compressed air motor, for accelerating the missile 10 or other unit being tested. This firing motor is indicated as a whole by the reference numeral 24 the other end portion of said motor constituting that portion of the cylinder 18 having a plurality of openings 26 providing exhaust ports, the end of the motor being outlined by the dot dash line W.

The cylinder 18 of the motor 24 is preferably extended to provide a brake apparatus 28, said apparatus comprising an open ended cylinder 30 and a piston 32 defined in the mechanism of our invention as a secondary piston. This brake apparatus serves as a shock absorbing means of the dual unit 24, 28, the apparatus 28 serving, in cooperation with other shock absorbing means described hereinafter, as a means for simulating the mode of deceleration to which the missile and its parts are subjected while in flight, and the motor 24 serving, by its operation, as a means for simulating the mode of acceleration to which the missile and its parts are subjected when the missile is, in actual operation, launched by a rocket or equivalent means.

An oscillograph 33 or equivalent instrument, and other means including a strain gauge 35 serve, as will be described hereinafter, to record the operation of the impact testing mechanism of our invention, or the strain gauge may be supplanted by an accelerometer. The oscillograph may be connected, by a conduit 31, with a port 35' in the piston 32 thereby providing means for measuring the pressure developed in the shock motor 28. The determination of this pressure serves as a means for adjusting the length of the shock absorbing air column of the shock motor 28. The strain gauge 35, serving in cooperation with the oscillograph 33 to indicate either the tension or the compression to which the rod 14 is subjected, is preferably mounted on said rod immediately adjacent the adapter plate 12; and an electrical conductor serves to interconnect the gauge with the oscillograph. In setting up the test mechanism of our invention in preparation for its use we may use a slide wire rheostat of known design, not shown, said rheostat cooperating with the oscillograph 33 to determine the acceleration and deceleration of the device being tested. In using the slide wire rheostat, the factors of distance and electrical resistance are introduced in the calculations. With this instrumentation, the operator may determine the particular point on the stroke of the mechanism where undue, that is abnormal, friction is encountered; for example the acceleration may be altered by a minute piece of foreign matter lodged in the bore of the firing motor 24, or the deceleration may be altered by a faulty operation of a hydraulic shock strut 36.

To the piston 32 of the shock brake apparatus 28 there is adjustably connected, by a rod 29 and a suitable adjustable connection 34, another shock absorbing means, preferably the hydraulic shock strut 36. The rod 29 is in disconnected engagement with the adjustable connecting means 34. Briefly describing the strut 36 this mechanism, disclosed in Figure 8, includes relatively movable tubular shaped members 37 and 38 fixedly secured respectively, to the adjustable connection 34 and to a reaction block 39 of cement or other suitable material. This reaction block is preferably embedded in a yieldable base 40, say of rubber, which is in turn embedded within the floor of the test laboratory.

A cylindrically shaped member 41 is secured to the member 37 and is mounted inside said member; and to one end of the member 41 there is secured a metering pin 42. To the member 41 there is secured a piston member 43; and a piston member 44 is secured to a tubular member 45 which is extended within and is secured at its upper end to the member 38. A chamber 46, outlined by the tube 45, the piston 44 and the metering pin 42 are filled with oil or other suitable incompressible fluid. An oil filler member 47 is connected with the chamber 46. Bearing members 48 and 48', secured respectively to the ends of the members 38 and 37, facilitate the desired relative movement of the latter members and the retention of fluid within the strut. When the mechanism is fired the members 37 and 41 as a unit move to the left, Figure 1, oil within a chamber 49 being expressed, via a centrally located metering orifice 45' in the piston member 44, into the chamber 46, thence through openings 51 in the member 45 into a chamber 53 outlined in large measure by the relatively movable members 37 and 45. From the chamber 53 the oil flows, via ports 55 in the member 37, into a chamber 57 and thence through a port 59 into a closed container 52 mounted on the strut.

When the strut is in its charged, that is ready to fire position disclosed in Figure 1, the fluid level in the container 52 is relatively low and is indicated by the line L and a sight gauge 54 indicates this fluid level by a line L'. As will be described in greater detail hereinafter a normally closed solenoid operated three way valve 56 of any well known design serves to control the flow of fluid into the container 52 when said valve is open; and when this valve is closed the container is connected to a conduit 123 via said valve. A solenoid operated two way valve 58 serves to facilitate the drainage of fluid from the container 52. As will be described hereinafter the container 52 and control valves 56 and 58 constitute a means, cooperating with the strut 36, taking the overflow fluid of the strut when the test mechanism is fired; and said container and valves also constitute means for recharging the shock strut after said firing operation.

Surrounding the firing motor 24, and preferably formed from part of the cylinder thereof, there is provided an air accumulator 60 which is connected with said motor by a plurality of ports 62 in the cylinder wall. This accumulator and the firing motor 24 connected therewith house air under pressure, say 70 to 150 p. s. i., depending upon the test to be made. The desired p. s. i. of pressure in the accumulator and motor is controlled by series connected solenoid operated two way valve 63, an air lubricator 64, a pressure gauge 66, a pressure regulator valve 68, an air filter 70, a manually operated two way cut off valve 72, and a suitable source of air pressure 74. The accumulator 60 is also provided with a pressure gauge 76, a solenoid operated blow down valve 78 and a safety valve 80 the latter being automatically operative to limit the pressure in the accumulator to a certain maximum.

Describing the operation of the controls for the accumulator 60 with the valve 72 open, the valve 78 closed, and the regulator valve 68 set for the desired pressure, the operator, from a control panel, not shown, operates a switch to open the solenoid operated valve 63 whereupon the air pressure within the accumulator and motor 24 is raised to the desired amount, say 100 p. s. i. After obtaining this desired pressure in the accumulator and motor 24 should the same increase before the firing operation is to be effected then the operator may lower the pressure back to the desired 100 p. s. i. by opening the blow down valve 78; and it is to be remembered that the safety valve 80 will, in any event, limit the pressure in the accumulator and firing motor to a certain maximum value.

Continuing the description of the controls for the mechanism of our invention there is provided a power operated latch mechanism 82 operative to hold the loaded piston 16 and its connected missile 10 in their ready to fire position disclosed in Figure 1. This latch mechanism 82, which is disclosed and claimed in the Mikel et al. U. S. application for patent, Serial No. 417,339 filed March 19, 1954, is disclosed in detail in Figure 2 and includes a double acting hydraulic motor comprising a tubular shaped casing member 84 sleeved over the piston rod 14 and secured at one of its ends to a ring 86 which is secured to the end plate 22 of the motor 24. The other end of the casing member 84 is secured to a flange 88 extending from and secured to one end of a sleeve member 90 telescoped within the member 84 and sleeved over the rod 14. A ring 91 secured to the rod 14 abuts the flange 88 when the piston 16 of the firing motor 24 is in its ready to fire position. The member 90 is preferably provided with a plurality of annularly spaced openings 92, each opening adapted to receive a ball 94 of steel or equivalent material. These balls, in the ready to fire position of the latch mechanism disclosed in Figure 2, contact a cam like ring member 96 of relatively hard material secured to the piston rod 14. The power or piston element of the double acting latch motor 83 comprises a tubular shaped member 98 sleeved within the casing member 84 and over the member 90; and this piston member 98 is preferably reduced in diameter at one end to receive a cam like ring member 100 of relatively hard material said member being contacted by the balls 94. Accordingly, the double acting hydraulic motor includes a casing member made up of the parts 84, 88, and 90 and a portion of the end plate 22 of the motor 24; and said motor also includes the piston member 98 reciprocably mounted within said casing member.

Continuing the description of the latch mechanism 82 oil under pressure is admitted, via a conduit 102 and a port 103, to a motor chamber 104; and this operation serves to move the piston 98 to the right to its locking position disclosed in Figures 1 and 2 the balls 94 being cammed downwardly to fit tightly against the ring 96 and rod 14. This operation of the latch mechanism 82 may be effected after and only after the piston 16 has been returned to its ready to fire position disclosed in Figures 1 and 2; for the latter operation moves the cam ring 96 to the right of the balls 94, Figure 2, thereby permitting said balls to move inwardly to rest upon the piston rod 14 and said ring 96.

The latch mechanism 82 is controlled by a solenoid operated four way valve 106, disclosed in detail in Figures 5, 6, and 7, said valve controlling the flow of power fluid into and from the hydraulic motor. No claim is made to this valve 106 nor for a solenoid and spring operated four way valve 107 operative to control a double acting hydraulic fluid motor 85. As will be described hereinafter this motor 85 serves to return the piston 16, missile 10 and interconnecting parts to their ready to fire position.

Describing the unlatching operation of the valve 106 and associated controls, a solenoid 108 when energized moves a plunger 110 to the right, Figure 5, to provide a flow of power fluid, preferably oil, in the direction indicated by the arrows in this figure. The oil enters the valve at a port 114 said fluid originating from a pump 116 via a conduit 118, Figure 1. An accumulator 117 may be connected to conduit 118 said unit being loaded to a pressure of say 400 p. s. i. From the valve 106 the oil passes through a conduit 120, Figure 1, connected to a port 122, Figure 2, said port being connected to a chamber 124 in the latch operating motor. As to the passage of the exhaust fluid in this unlatching or firing operation of the valve 106, the oil flows from the aforementioned chamber 104 into the port 103 in the motor, thence through the conduit 102, Figure 1, and through the valve as indicated by the arrows in Figure 5. The exhaust oil then passes from an exhaust port 126 in the valve into a conduit 128 and thence into a supply tank 130, vented to the atmosphere at 132. The tank 130 is positioned in the system at a lower level than the container 52. It is apparent therefore that by an operation of the solenoid 106 there is effected the firing operation of the latch operating motor the piston 98 of said motor being moved to the left, Figures 1 and 2, to permit the balls 94 to seat in recesses 134, Figure 2, in the piston and thereby clear the way for a firing movement of the motor piston 16.

Referring to the pump 116 a relief valve 115, incorporated in a conduit 117' interconnecting the conduit 118 and tank 130, serves to limit the output pressure of the pump to a certain maximum; and it may be noted here that pump 116 is connected, by a conduit 119 and a portion of the conduit 118, with the solenoid operated three way control valve 56, Figure 1. A pressure regulating valve 121 may be incorporated in this conduit 119 to control the pressure of the oil flowing to the container 52; and the conduit 123 serves to interconnect the tank 130 and the exhaust port of the valve 56.

Describing the motor latching operation of the valve 106, energization of a solenoid 136, Figures 1 and 6, serves to move the plunger 110 to the left, Figure 6, to circuit the power fluid in the direction indicated by the arrows. As will be noted from an examination of Figures 1, 2 and 6 and from a reading of the aforementioned description of the firing operation of the valve 106 and the description of the construction of the latching mechanism 82, this operation of the plunger 110 serves to energize the latch operating motor to effect a latching or locking operation of the firing motor 24 the piston 98 of said motor moving to the position disclosed in Figures 1 and 2. It is accordingly apparent that an operation of the solenoid 136 by the electrical controls, not shown, serves to effect the latching operation to lock the motor piston 16 in its ready to fire position. Completing the description of the valve 106 the parts of the same are shown in their neutral position in Figure 7.

Describing now the aforementioned valve 107 which controls the motor 85, as with the valve 106 the direction of flow of fluid in the valve is indicated by arrows. To effect an operation of the motor 85 to return the piston 16 and members connected thereto to their ready to fire position the operator will, by an operation of a switch on the control panel, not shown, energize a solenoid 138, Figure 3, to move a plunger 140 to the right thereby effecting a flow of power fluid from the pump 116 to a chamber 142 in the motor 85 via the conduit 118, a conduit 144, the valve 107, and a conduit 146. In this operation the exhaust fluid flows from a chamber 148 in the motor 85 to the supply tank 130 via a conduit 150, the valve 107, a conduit 152, a hydraulic speed control valve 154, and a conduit 156.

With the above described energization of the motor 85 a piston 158 of said motor moves to the right, Figure 1, to return the piston 16 and missile 10 to their ready to fire position disclosed in said figure. The piston 158 is connected to a yolk member 160 by a rod 162 said yolk being slidably mounted on a rail 164 fixedly secured at one of its ends to a standard 166 and at its other end to the accumulator 60. In this operation, the plate 12 in the fired position of the mechanism is to the left, Figure 1, and a thrust member 61 secured to the rod 14 is in contact with the yolk.

Describing the return operation of the motor 85 the valve 107 is operated by the opening of the electrical circuit controlling the solenoid 138 said operation resulting in the expansion of a valve spring 168, Figure 4; and the resulting operating the valve, all as disclosed in Figure 4, results in an energization of the motor 85 to return the yolk 160 to its position disclosed in Figure 1.

Describing now the complete operation of the mechanism of our invention and incidentally completing the description of the details of this mechanism not heretofore described, it will be assumed that the piston 16 and the controls, including the mechanism of the oscillograph 33, have been returned to their ready to fire position, that the double acting latch operating fluid motor of the latch mechanism has been energized to move the piston 98 to its locking position, that the missile 10 to be tested has been secured to the plate 12, and lastly that the firing motor 24 has been energized by bringing its pressure up to say 100 p. s. i. It is also to be remembered that the shock strut 36 and the piston 32 connected thereto are at this time also moved to the right, Figure 1, to their ready to fire positions.

The mechanism is now ready for the test whereupon the operator, by a trigger operation of the controls, not shown, will energize the solenoid 108 to operate the valve 106 as is disclosed in Figure 5; and this operation will effect an energization of the latch motor to unlatch the latching mechanism 82. The then energized motor 24 will then operate to pull the missile 10 to the left, Figure 1, the mass, that is the piston 16, rod 14 and connected missile 10 being accelerated by a factor indicated at A on a time versus positive and negative acceleration graph 170 disclosed in Figure 9. The initial acceleration may be, say 5 g's. As indicated on the graph the acceleration of this mass will progressively decrease until the piston 16 enters the pressure differential operated shock apparatus 28 the air within the motor 24 being exhausted to the atmosphere via the ports 26.

Continuing the description of the stroke of the mass 10, 14, 16, the deceleration thereof, at a factor of say 30 g's, will be initiated at point B on the graph, when the piston 16 enters the shock apparatus 28 said deceleration, as indicated on the graph, being progressively increased until said piston reaches a position close to the piston 32 of said apparatus. The deceleration factor will then, by virtue of the particular construction and arrangement of the parts of the mechanism of our invention, remain substantially constant for a limited time, as indicated by C on the graph; and at the end of the stroke the deceleration factor will progressively increase until all of the kinetic energy of the mass is absorbed, the missile and parts connected thereto then coming to a state of rest. In this operation of absorbing, that is dissipating the kinetic energy of the mass, the movable unit 37, 41 of the strut 36, the adjustable connection 34, and the piston 32 will, at a certain time in the stroke, move relative to the moving mass 10, 14, 16 but at a different rate. It is also to be noted that in this firing operation the fluid in the container 52 will rise to a level R, air being forced from said container to the tank 130 via the normally closed valve 56 and the conduit. The valve 58 is operated just prior to this firing operation.

It is to be noted that in this firing operation of the mechanism, the device tested being accelerated and decelerated, that the recording instruments including the strain gauge 35 and the oscillograph 33 or equivalent instrument are at this time operative to record the results of the test including the acceleration and deceleration of the tested device and the strain, that is tension and compression loads, of the rod 14. As stated above the mechanism of our invention is designed to simulate the operation of the launching mechanism of the missile and, in a measure, simulate the operation of the missile while the same is in flight; and our invention is also designed to record certain effects of said operations. Accordingly the dual motor and brake unit 24, 28 and cooperating mechanism are designed to effect the aforementioned operations; and the oscillograph and cooperating elements, including the strain gauge 35 or its equivalent and other instruments such as an amplifier, are designed to effect the recording operation without tedious calculations; for example the pressure conduit 31 and cooperating elements will aid in determining the desired column of air in the working compartment of the brake unit 28; and a switch 172, Figure 1, electrically connected to the oscillograph will advise the operator when the latch mechanism 82 is in its locked position. Other position indicating instruments, such as phototubes, may be used to determine the position of parts of the mechanism during the testing operation. The cooperation of the strain gauge 35 and the load transmitting member 14 with the cooperation of suitable associated equipment including the oscillograph and say an amplifier, will, when properly calibrated, yield a direct and accurate means of measuring acceleration or deceleration without tedious calculations; and the use of the slide wire rheostat will, as heretofore referred to in the specification, facilitate the setting up of the mechanism of our invention by determining the points in the strokes of the mechanism where abnormal resistance is encountered.

Now by the laws of mechanics force equals mass, that is weight divided by gravity, multiplied by acceleration whether it be positive or negative; accordingly with the mechanism of our invention when the compression or tension of the rod 14 is measured by the gauge 35 with cooperation of the oscillograph the operator can determine the acceleration and deceleration to which the missile casing and its housed elements are subjected. In this calculation, it is to be remembered that the mass is a constant. It also follows that the kinetic energy of the moving parts 10, 14 and 16 may be determined inasmuch as kinetic energy is equal to the product of the mass times the velocity squared, divided by two. The mass being a constant the kinetic energy of the mass may be obtained by determining the velocity of said mass.

Continuing the description of the operation of the mechanism of our invention after the same has been fired and the results recorded, the operator will, after a closing of the valve 58 by an operation of a solenoid 171, effect an operation of a solenoid 174 to open the valve 56 to admit oil under pressure from the pump 116 thereby returning the strut 36 to its ready to fire position; and a concurrent or substantially concurrent operation of the valve 107 results in an energization of the motor 85 to return the piston 16 to the right, Figure 1, to its ready to fire position. Then just as the motor 85 completes this operation a flange 180 on a member 182 operates to close a switch 184 thereby automatically advising the operator, by his examination of the indicator panel of the mechanism, that the piston 16 has been returned to its cocked that is ready to fire position; and the closing of the switch 184 also serves, as described above, to operate the valve 107 to energize the motor 85 to return the yolk 160 to its off position disclosed in Figure 1. The operator then operates the valve 106 to effect a latching operation of the mechanism 82, and then closes the valve 56 and opens the valve 58 thereby draining fluid from the container 52 down to its ready to fire level L; and after this operation is completed the operator will close the valve 58. The latch operating motor is then operated to lock the piston 16 in place; and this operation completes the operation of the mechanism preparatory to repeating the test run.

There is thus provided a compact, effective and efficient testing mechanism for determining the effects upon a device, such as the pilot seat of an airplane, a military tank, an engine mount, a safety belt, automotive parts or a guided missile, when said device is accelerated from a condition of rest to a condition of motion and when said device is decelerated when in motion. The particular power unit 24, 28 disclosed in this application is only one embodiment of the power unit of our invention; for said unit may be supplanted by a unit including any suitable means for accelerating the specimen to be tested and any suitable means for decelerating said specimen, both of said means cooperating with the shock strut or its equivalent, the recording instruments, and the remainder of the disclosed mechanism.

Although a particular embodiment of our invention has been described, it will be understood by those skilled in the art that the object of the invention may be attained by the use of constructions different in certain respects from that disclosed without departing from the underlying principles of the invention. We therefore desire by the following claims to include within the scope of our invention all such variations and modifications by which substantially the results of our invention may be obtained through the use of substantially the same or equivalent means.

We claim:

1. A test mechanism for accelerating and decelerating a specimen to be tested, said mechanism including a pressure differential operated firing motor, means, operable before the motor is fired, for controlling the operation of said motor to ready the same for firing, means for interconnecting the firing motor with the specimen to be tested, a brake apparatus connected to the firing motor and means connected with the brake apparatus and operative, with an operation of the firing motor, to supplement the braking apparatus in dissipating the kinetic energy of the power element of the firing motor and the specimen being tested connected thereto.

2. A test mechanism for accelerating and decelerating a specimen to be tested, said mechanism including a pressure differential operated firing motor, means, operable before the motor is fired, for controlling the operation of said motor to ready the same for firing said means including an accumulator and controlling means therefor, means for interconnecting the firing motor with the specimen to be tested, a brake apparatus connected to the firing motor; and means connected with the brake apparatus and operative, with an operation of the firing motor and cooperating with the brake apparatus, to dissipate the kinetic energy of the power element of the firing motor and parts, including the specimen to be tested, connected thereto.

3. A test mechanism for accelerating and decelerating a movable device, said mechanism including a pressure differential operated firing motor, means, operable before the motor is fired, for controlling the operation of said motor to ready the same for firing, means for interconnecting the firing motor with the device to be tested, a brake apparatus connected to the firing motor, means connected with the brake apparatus and operative, with an operation of the firing motor and cooperating with the brake apparatus, to dissipate the kinetic energy of the power element of the firing motor and all parts, including the device being tested, connected thereto; and means, including a pressure differential operated motor and control means therefor, for returning the power element of the firing motor and parts connected thereto to their ready to fire position.

4. A test mechanism for accelerating and decelerating a device said mechanism including a pressure differential operated firing motor, means, operable only before the motor is fired, for controlling the operation of said motor to ready the same for firing, means interconnecting the firing motor and device to be tested, a brake apparatus operably connected to the firing motor, means connected with the brake apparatus and operative, with an operation of the firing motor, to cooperate with the brake apparatus in dissipating the kinetic energy of the power element of the firing motor and all parts, including the device being tested, connected thereto; means including a pressure differential operated motor and control means therefor, for returning the power element of the firing motor and parts connected thereto to their ready to fire positions, and latch means, including a pressure differential operated motor, for holding the power element of the firing motor in its ready to fire position.

5. A test mechanism for in part simulating the operation of any device which may be bodily accelerated and decelerated, said mechanism comprising a dual unit including a firing motor and a shock apparatus said motor and shock apparatus having a common casing member, means for interconnecting the firing motor with the device being tested, means, operable only before the firing motor is fired, for controlling the operation of said motor to ready the same for firing; and means connected with the shock apparatus and cooperating therewith and operative, with a firing operation of the firing motor, to dissipate the kinetic energy of the power element of the firing motor and parts connected thereto.

6. A test mechanism for in part simulating the operation of a guided missile comprising a two-part unit including a firing motor and shock apparatus said motor and apparatus having a common casing member, means for interconnecting the firing motor with the guided missile to be tested, means, including an accumulator and controlling means therefor, for controlling the operation of the firing motor said control means being operable only before the firing motor is fired, and means connected with the shock apparatus and cooperating therewith and operative, with a firing operation of the firing motor, to dissipate the kinetic energy of the power element of the firing motor and parts connected thereto.

7. A test mechanism for in part simulating the operation of a guided missile comprising a two-part unit including a firing motor and a shock apparatus said motor and apparatus having a common casing member, means for interconnecting the firing motor with the guided missile to be tested, means, operable before the firing motor is fired, for controlling the operation of said motor to ready the same for firing, means connected with the shock apparatus and operative, with a firing operation of the firing motor, to in part dissipate the kinetic energy of the power element of the firing motor and parts connected thereto; and means, including a pressure differential operated motor and control means therefor, for returning the power element of the firing motor and parts connected thereto to their ready to fire position.

8. A test mechanism for in part simulating the operation of a guided missile comprising a two-part unit including a firing motor and a shock apparatus said motor and apparatus having a common casing member, means, including a rod, for interconnecting the firing motor with the guided missile to be tested, means, operable only before the firing motor is fired, for controlling the operation of the firing motor to ready the same for firing, means connected with the shock apparatus and cooperating therewith, said means and shock apparatus being operative, with a firing operation of the firing motor, to dissipate the kinetic energy of the power element of the firing motor and parts connected thereto; means including a pressure differential operated motor and control means therefor, for returning the power element of the firing motor and parts connected thereto to their ready to fire positions; and latch means, including a pressure differential operated motor, for holding the power element of the firing motor in its ready to fire position said latch means acting directly upon the rod interconnecting the firing motor and missile to be tested.

9. A test mechanism adapted to in part simulate the operation of a guided missile to thereby determine the stresses and strains to which parts of the missile are subjected by virtue of their inertia when the missile is launched and is being propelled in flight, said test mechanism comprising a firing motor, means adapted to interconnect said motor with a missile to be tested, means, operable only before the firing motor is fired for controlling the operation of said firing motor to ready the same for firing, means, including a hydraulic shock strut, operative, with a firing operation of the firing motor, to in part absorb the kinetic energy of the power element of the firing motor and parts connected thereto; and means, including a shock apparatus comprising a cylinder and a piston, serving as a force transmitting means to interconnect the power element of the firing motor and the hydraulic shock strut and also serving as a means for in part absorbing the kinetic energy of the power element of the firing motor and parts connected thereto.

10. A test mechanism for in part simulating the operation of any device which may be bodily accelerated and decelerated, said mechanism comprising power means including means for accelerating the device being tested and means for decelerating said device, means adapted to interconnect the accelerating means and device being tested, means, operable before the accelerating means is operated, for controlling the operation of the accelerating means and operable to ready the latter for action, and means connected with the decelerating means and operative, with an energization of the accelerating means, to supplement the deenergizing means in dissipating the acceleration producing energy of the accelerating means.

11. A test mechanism for in part simulating the operation of any device which may be bodily accelerated and decelerated, said mechanism comprising power means including means for accelerating a device to be tested and means for decelerating said device, means, including a rod, adapted to interconnect the accelerating means and device to be tested, means, operable before the accelerating means is operated, for controlling the operation of the accelerating means and operable to ready the latter for action, and means, including a quantity of oil housed in a tank, connected with the decelerating means and operative, with an energization of the accelerating means, to supplement the deenergizing means in dissipating the acceleration producing energy of the accelerating means, said means connected with the decelerating means being operable to control the dissipation of said acceleration producing energy.

12. A test mechanism adapted to in part simulate the operation of a guided missile to thereby determine the stresses and strains to which parts of the missile are subjected by virtue of their inertia when the missile is launched and is being propelled in flight, said test mechanism comprising a firing motor, means adapted to interconnect said motor and missile to be tested, means, operable only before the firing motor is fired, for controlling the operation of said firing motor to ready the same for firing, means, including a hydraulic shock strut, operative, with a firing operation of the firing motor, to in part absorb the kinetic energy of the power element of the firing motor and all moving parts connected thereto including the missile being tested; means for controlling the operation of the shock strut including means for taking the overflow fluid of the strut when the mechanism is fired and for returning hydraulic fluid to the shock strut after the latter has served its purpose in the operation of the mechanism; and means, including a shock apparatus, serving as a force transmitting means to interconnect the power element of the firing motor and the shock strut and also serving as a means for in part absorbing the kinetic energy of the power element of the firing motor and all moving parts connected thereto.

13. A test mechanism for in part simulating the operation of any device which may be bodily accelerated and decelerated, said mechanism comprising power means, including as a unit a pressure differential operated firing motor, a pressure differential operated energy dissipating shock apparatus and a hydraulic shock apparatus, for accelerating or decelerating a device to be tested, means, including a connecting rod, adapted to interconnect the power element of the firing motor with a device to be tested, means for holding the power element of the firing motor and parts connected thereto in their ready to fire position, means for controlling the operation of the latter means, and means cooperating with the aforementioned connecting rod and operable, after a firing operation, for returning the power element of the firing motor and parts connected thereto to their ready to fire position.

14. A test mechanism for simulating the operation of a device which is, in said operation, subjected to certain stresses and strains resulting from bodily accelerating and decelerating said device; said mechanism including power means comprising a plurality of power elements operably connected to the device, casing means housing the power elements and, together with said elements, constituting means outlining compartments receiving power fluid, means, operable before the power means is fired, for controlling the operation of the power means to ready the same for firing, and means, housed within a part of the casing means and secured to one of the power elements, for controlling the flow of a part of the power fluid to control the deceleration of the latter power element and the device being tested which is operably connected thereto.

15. A test mechanism for simulating the operation of a device which is, in said operation, subjected to certain stresses and strains resulting from bodily accelerating and decelerating said device; said mechanism including power means comprising a plurality of power elements operably connected to the device, casing means housing the power elements and, together with said elements, constituting means outlining compartments receiving power fluid, a portion of said fluid being oil and a portion thereof being gas, means, operable before the power means is fired, for controlling the operation of the power means to ready the same for firing, and a metering pin, housed within a part of the casing means and secured to one of the power elements, for controlling the flow of oil to control the deceleration of the latter power element and the device being tested which is operably connected thereto.

16. A test mechanism for simulating the operation of a device which is, in said operation, subjected to certain stresses and strains resulting from bodily accelerating and decelerating said device; said mechanism including power means operable to effect a progressive change in the magnitude of the acceleration and deceleration of the device being tested and comprising a plurality of pistons operably connected to the device, casing means housing said pistons and housing power fluid, a part of said casing means cooperating with one of the pistons to provide a firing motor, a portion of the casing of said motor being constructed to cooperate with the latter piston in controlling the acceleration of the device being tested; means, operable before the firing motor is fired, for controlling the operation of said motor to ready the same for firing; and means, housed within a part of the casing means and secured to one of the pistons, for controlling the flow of power fluid to control the deceleration of the latter piston and therefore the deceleration of the device being tested.

17. A test mechanism for simulating the operation of a device which is, in said operation, subjected to certain stresses and strains resulting from bodily accelerating and decelerating said device; said mechanism including power means operable to effect a progressive change in the magnitude of the acceleration and deceleration of the device being tested and comprising a plurality of pistons operably connected to the device, casing means housing said pistons and housing power fluid comprising oil and gas, a part of said casing means cooperating with one of the pistons to provide a firing motor, a portion of the casing of said motor being constructed to cooperate with the latter piston in controlling the acceleration of the device being tested; a gas control means for introducing gas into the firing motor, and means, housed within a part of the casing means and secured to one of the pistons, for controlling the flow of oil to control the deceleration of the latter piston and therefore the deceleration of the device being tested.

References Cited in the file of this patent

UNITED STATES PATENTS

| | | |
|---|---|---|
| 2,475,614 | Hoppmann et al. | July 12, 1949 |
| 2,475,723 | Sanford | July 12, 1949 |
| 2,498,045 | Looney et al. | Feb. 21, 1950 |
| 2,512,205 | Hall | June 20, 1950 |
| 2,537,096 | Shreeve et al. | Jan. 9, 1951 |
| 2,573,285 | Statham | Oct. 30, 1951 |
| 2,604,777 | Armstrong et al. | Oct. 30, 1952 |
| 2,689,938 | Larson | Sept. 21, 1954 |

UNITED STATES PATENT OFFICE

CERTIFICATE OF CORRECTION

Patent No. 2,810,288                                  October 22, 1957

Rolfe M. Herron et al.

It is hereby certified that error appears in the printed specification of the above numbered patent requiring correction and that the said Letters Patent should read as corrected below.

Column 6, line 70, after "conduit" insert -- 123 --.

Signed and sealed this 19th day of August 1958.

(SEAL)
Attest:

KARL H. AXLINE                                          ROBERT C. WATSON
Attesting Officer                                    Commissioner of Patents